(12) United States Patent
Mussot

(10) Patent No.: US 8,499,969 B2
(45) Date of Patent: Aug. 6, 2013

(54) PNEUMATIC COMPONENT FOR THE CONTROLLED MICRO-DIFFUSION OF GAS

(75) Inventor: Jean-Luc Mussot, Loriol (FR)

(73) Assignee: Ad Venta, Loriol (FR)

( * ) Notice: Subject to any disclaimer, the term of this patent is extended or adjusted under 35 U.S.C. 154(b) by 787 days.

(21) Appl. No.: 12/295,538

(22) PCT Filed: Apr. 19, 2006

(86) PCT No.: PCT/FR2006/000883
§ 371 (c)(1),
(2), (4) Date: Feb. 4, 2009

(87) PCT Pub. No.: WO2007/113394
PCT Pub. Date: Oct. 11, 2007

(65) Prior Publication Data
US 2010/0237095 A1    Sep. 23, 2010

(30) Foreign Application Priority Data

Mar. 30, 2006  (FR) ..................................... 06 02771

(51) Int. Cl.
*B67D 7/00* (2010.01)
(52) U.S. Cl.
USPC .......................................................... 222/3
(58) Field of Classification Search
USPC ..... 222/3, 396, 402.1, 399, 402.13; 137/494, 137/495, 505.41
See application file for complete search history.

(56) References Cited

U.S. PATENT DOCUMENTS

| | | | | |
|---|---|---|---|---|
| 3,341,082 A | * | 9/1967 | Meshberg | 222/148 |
| 4,456,155 A | * | 6/1984 | Miyata et al. | 222/396 |
| 4,785,977 A | * | 11/1988 | Ball | 222/399 |
| 4,971,224 A | * | 11/1990 | Scremin | 222/3 |
| 5,042,697 A | * | 8/1991 | Warren | 222/402.1 |
| 5,070,901 A | * | 12/1991 | Black | 137/495 |
| 5,143,077 A | * | 9/1992 | Kobayashi | 600/490 |
| 5,158,215 A | * | 10/1992 | Comment | 222/396 |
| 5,226,573 A | * | 7/1993 | Brugerolle et al. | 222/402.1 |
| 5,285,931 A | * | 2/1994 | Alfons | 222/61 |
| 6,158,629 A | * | 12/2000 | Abplanalp et al. | 222/402.1 |
| 6,412,668 B1 | * | 7/2002 | Vlooswijk et al. | 222/396 |
| 6,415,963 B1 | * | 7/2002 | Vlooswijk et al. | 222/396 |
| 6,431,412 B1 | * | 8/2002 | Abplanalp et al. | 222/402.1 |
| 6,581,807 B1 | * | 6/2003 | Mekata | 222/402.1 |
| 7,658,338 B2 | * | 2/2010 | Matsumoto et al. | 239/337 |
| 7,913,882 B2 | * | 3/2011 | Wolthers et al. | 222/396 |

FOREIGN PATENT DOCUMENTS

| | | |
|---|---|---|
| EP | 0 678 797 | 10/1995 |
| FR | 2 711 973 | 5/1995 |
| FR | 2 876 809 | 4/2006 |
| WO | WO 00/35774 | 6/2000 |

* cited by examiner

*Primary Examiner* — Paul R Durand
*Assistant Examiner* — Donnell Long
(74) *Attorney, Agent, or Firm* — Patterson Thuente Pedersen, P.A.

(57) ABSTRACT

A pneumatic component for the controlled micro-diffusion of gas, intended to be fastened to a pressurized gas reservoir having an aerosol valve. The pneumatic component includes a hollow body whose inner portion has at least one upper chamber enclosed by a leaktight, moving shutter, and a fastening system designed to cooperate in a leaktight manner with the upper part of the container. At least one lower chamber of the pneumatic component is formed, once the component has been fastened to the container, between the shutter and the upper part of the container. The shutter bears against the valve, and a lateral orifice in communication with the lower chamber is designed to expel gases from the container to the outside of the pneumatic component.

12 Claims, 3 Drawing Sheets

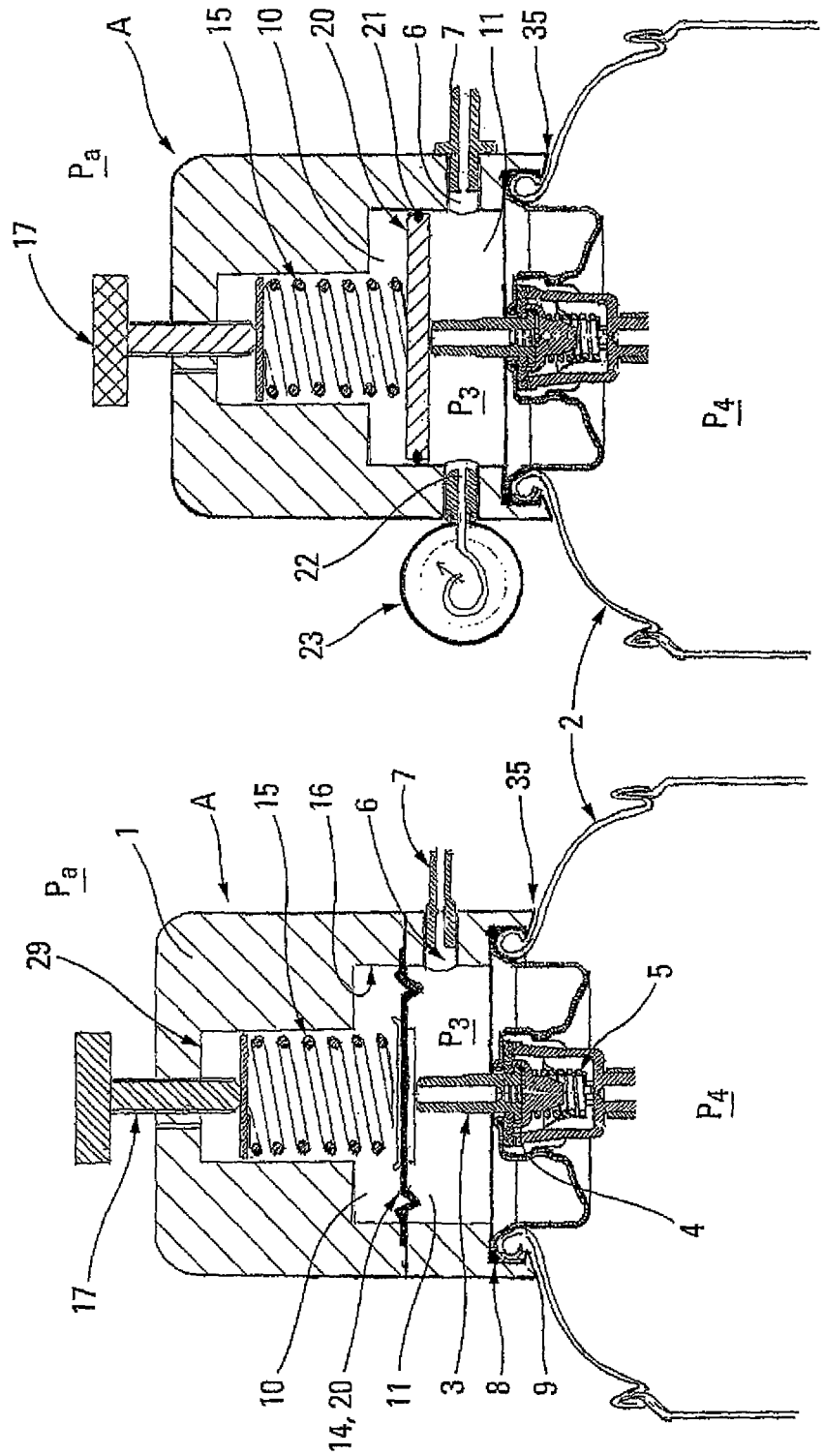

PNEUMATIC COMPONENT FOR THE CONTROLLED MICRO-DIFFUSION OF GAS

RELATED APPLICATIONS

This application is a national stage entry from PCT Application No. PCT/FR2006/000883 filed Apr. 19, 2006, which claims priority to French Application No. 06/2771 filed Mar. 30, 2006, the disclosures of which are hereby incorporated by reference in their entireties.

FIELD OF THE INVENTION

The invention relates to a pneumatic component for the controlled micro-diffusion of any gas, such as mixtures of aerosol gases; this description will refer to the single denomination of "gas" for any composition, mixture or single-component gas.

The technical sector of the invention is the field of flow control for a fluid, in particular in the field of regulating a gas flow at a constant rate under low pressure and more particularly in the diffusion of a gas or gas mixture contained in a container of the aerosol can type.

BACKGROUND OF THE INVENTION

Conventionally, an aerosol can comprises of a cylindrical-shaped gas container provided with, on one of its faces, referred to as the upper portion and closing its cylindrical-shaped casing, a retainer whereon a valve is attached. This valve allows the exiting of the aerosol pushed by the propellant gas contained under pressure when the latter is maintained pressed. This type of can may also be used as a compressed gas container.

This known device has the disadvantage of not being able to obtain a constant rate of outflow since the latter varies according to the internal pressure of the gas contained in the can.

It is certainly also known to be able to regulate the pressure and therefore the rate of a flow of gas at the outflow of a pressurized container using a regulator taking into account the exterior or ambient pressure and the variations of pressure of the source of gas.

Such a regulator generally comprises a valve pushed back into a closed position against a seating and controlling the passage of the flow of gas from the high pressure portion to a low pressure chamber, a control member of the valve under the dependency of a membrane or piston closing on one side of the low pressure chamber, a retaining means or spring butting against the other side of the membrane or piston, and a means of adjusting the retaining means.

Many devices have been developed to adapt such regulating systems to aerosol containers, in order to limit the disadvantage of providing only a rate of outflow that varies with the internal pressure of the compressed gas in the container and that therefore of course goes down as it is used.

French Patent Application No. FR 2774077 of the LOREAL company discloses an internal modification of the valve itself of the aerosol container in order to correct the output pressure of the fluid but without changing the operating principle of the aerosol itself, i.e., requiring a manual pressing on the dispensing button and comprising multiple parts forming a rather complex device.

Likewise, French Patent Application No. FR 2702465 to LE COFFRE and TOURNASSAT is discloses a device added to the aerosol container without modifying the latter and creating a loss of head through a very long channel of small section, in order to obtain a low rate but which is not constant for aerosol containers containing non-liquefied gas, and of which the realization is also complex.

Other devices of the same or similar type, either do not satisfy, as hereinabove, a genuine regulation of a gas flow at a constant rate under low pressure, such as is necessary for the calibration of analyzers, or they still require the manual intervention of an operator in order to maintain a control button pressed releasing the gas to be dispensed, or they are for the most part rather complex to realize, requiring special machine toolings in order to have the associated seatings and valves, as well as various channels connecting the upper pressure and low pressure chambers of the regulating device that one wants to obtain.

Indeed, the maintaining of a manual pressing is not compatible with the necessity to diffuse a gas continuously (even during several days without stopping) for applications, such as by way of example the diffusion of scents or pheromones, or for the stimulation of rubber trees by ethylene gas which allows for increased production of latex with a dispenser of ethylene at a very low constant continuous rate, and attached to each tree.

Therefore, there remains a need for a pressure maintaining device, at the outflow of an existing valve of an aerosol container, at a constant value that is defined by the user and to diffuse as such the gas contained in the latter at a constant rate, and continuously without manual actuation other than that of putting it into operation and therefore not necessarily maintained on the device during the entire dispensing of gas, the device having to be as simple as possible to realize, requiring less parts than the known regulators, easy to set up and utilizing existing technologies to the fullest that are already developed for high-volume applications.

SUMMARY OF THE INVENTION

A solution to the problem is a pneumatic component for the controlled micro-diffusion of gas, intended to be fastened on a gas container, with such container being a pressurized gas reservoir provided with an aerosol type valve, such component comprising:
  a hollow body of which the interior portion comprises at least one upper chamber closed by a leaktight, moving shutter in relation to the lateral interior walls of the interior portion of the hollow body and which surround said shutter forming a control member,
  a fastening system of the body, attached to the periphery of the distal end of its hollow portion beyond the shutter in relation to the upper chamber and able to cooperate in a leaktight manner with the upper portion of the container surrounding the valve,
  at least one lower chamber which is constituted once the component is fixed on the container, and closed between the shutter and said upper portion of the container, and said shutter bearing according to a predetermined force against said valve,
  a lateral orifice pierced in the body and communicating with the lower chamber, and able to provide for the evacuation of the gases contained within the container, and through the lower chamber, towards the exterior of the component once attached to the latter.

The result is a new device for controlling a gas flow, adapted to be mounted directly via snapping onto containers of the aerosol type of which is used the existing aerosol valve as a high-pressure valve without modification of the latter; this new device for controlling and adjusting pressure mass produced making it possible to reduce the manufacturing costs in relation to the current systems that call upon special components that prohibit economical solutions; this invention makes it possible to position itself in existing markets with a strong competitive advantage, by offering a component that has a unitary, compact and ergonomic shape, and which requires the implementation of only a minimum of parts.

Such a pneumatic component makes it possible to continuously provide the diffusion of the gas using the pre-existing aerosol container and remaining unchanged, and this without constant manual actuation.

The description hereinafter and the enclosed drawings show an embodiment of the invention, but are in no way limiting: other embodiments are possible within the framework of the scope of this invention.

BRIEF DESCRIPTION OF THE DRAWINGS

FIG. 3 depicts an axial cross-section of a pneumatic component for regulating the flow of gas mounted in place on a gas container according to an embodiment of the invention.

FIG. 4 depicts a pneumatic component according to an embodiment of the invention.

DETAILED DESCRIPTION OF THE DRAWINGS

Figure 1:
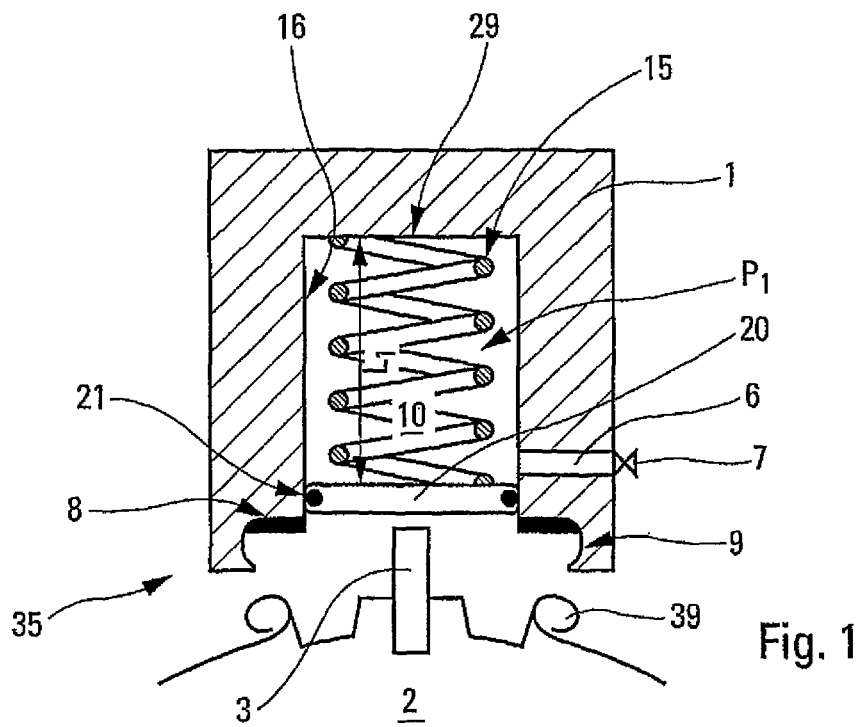
FIG. 1 depicts an axial and lateral cross-section of a pneumatic component ready to be mounted on an existing an known aerosol container according to an embodiment of the invention.

The pneumatic component according to the invention comprises a substantially tubular hollow body 1 and made of a material compatible with and leaktight to the gases used, such as a plastic material: its interior portion comprises at least one first upper chamber 10 and closed by a shutter 20, leaktight in relation to interior lateral walls 16 of the interior portion of hollow body 1 and that surround shutter 20 forming a control member.

At its distal end 35, open beyond shutter 20 in relation to upper chamber 10, the pneumatic component according to an embodiment of the invention comprises a fastening system 9 of body 1, attached to its periphery and able to cooperate in a leaktight manner with the upper portion of a gas container 2 under pressure $P_4$ provided with an aerosol valve 3; said fastening system 9 comprises a seal 8 and a hooking assembles such as a rounded edge towards the interior and elastic, cooperating by "forced nesting" with circular portion 39 of container 2 which ensures the integration of the entire aerosol valve support 3 on the upper portion of the casing of container 2 and which is generally of a section also of rounded shape: this fastening system 9 of the pneumatic component according to an embodiment of the invention surrounds the valve 3 and makes it possible to constitute, once the component attached to container 2 (such as shown in FIGS. 2, 3, 4 and 6) a first lower chamber 11 between shutter 20 and said upper portion of container 2.

Figure 5:
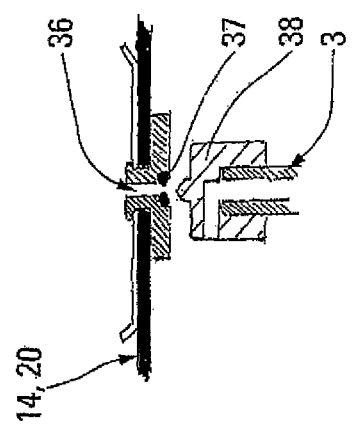
FIG. 5 depicts a partial cross section describing additional technical details according to an embodiment of the invention.

During the fastening of the pneumatic component to aerosol container 2, the control member or shutter 20 bears according to a predetermined force against the upper end of valve 3 and comprises any device making possible such a bearing against without obstructing the outflow orifice of the latter such as is shown in FIG. 5.

According to embodiments of the invention depicted in the attached figures, upper chamber 10 can contain a gas such as air at an initial pressure $P_1$ (such as according to FIGS. 1 and 2) or a spring 15 (according to FIGS. 3 and 4) whether or not associated to a an adjusting apparatus 17, or even both (according to FIGS. 1 and 2), which bear against control member 20.

By combining the force of a spring and the compression of a gas the possibility is as such increased of adjusting the bearing force of control member 20 on valve 3, the reaction force due to the compression of spring 15 acting in the same direction as that of the gas contained in chamber 10. This spring 15 can be a spiral spring of which one end presses against end 29 of upper chamber 10 of the hollow body or on adjusting 17, and the other end on control member 20, as shown in the attached figures.

At rest, i.e. with the pneumatic component not yet being attached to container 2, control member 20 is located at a distance L1 from end 29 which comprises the end opposite to that distal 35 of the component, and when the latter is attached to container 2, the pressing, according to a predetermined force according to the pressure $P_1$ and/or the chosen characteristics of spring 15, of control member 20 against said valve 3 causes it to rise back up to a distance L2: this operation compresses the spring and/or the gas contained in chamber 10, while causing the mobile portion of valve 3 of the aerosol container to descend towards the interior of the latter, thus allowing to exit via valve 3 the gas or gas mixture contained in container 2 and which fills lower chamber 11; then this gas escapes towards the exterior of the component from this chamber 11 via a lateral orifice 6 forming a low pressure outflow, pierced in body 1 and communicating with chamber 11, once the device is attached to container 2.

Said orifice 6 can be provided with a valve 7 being able to ensure the function of a flow regulator with a desired value, or comprises at least one calibrated nozzle element.

This outflow orifice 6 being calibrated as such or able to be adjusted makes it possible to predefine a certain flow of gas according to the pressure $P_3$ also predefined prevailing in the chamber 11, said pressure $P_3$ being itself maintained by a pressure side on either side of control member 20 with the pressure $P_2$ prevailing in upper chamber 10 and/or the retaining force of spring 15.

If this pressure $P_3$ decreases due to the gas escaping via orifice 6, control member 20 then descends via the effect of the pressure $P_2$ and/or of spring 15 and bears against valve 3, thus releasing more gas, which causes the pressure $P_3$ to rise again back up to equilibrium because if this pressure $P_3$ were to exceed the pressure $P_2$ and/or the retaining force of spring 15, valve 3 would rise up completely until it closes, stopping the outflow of gas from container 2 in lower chamber 11.

As such, the high pressure $P_4$ prevailing in container 2 is returned in lower chamber 11 of the component to a medium pressure $P_3$ by the control member 20 according to the calibrating force of spring 15 and/or of the pressure $P_2$ prevailing in upper chamber 10.

The user thus has available at the joint of the low pressure outflow 6, a gas available at a low pressure, typically slightly greater than the atmospheric pressure, and at a regulated, permanent and constant rate (as long as the pressure $P_4$ in container 2 is greater than that of $P_3$), such as is necessary for example for applications for calibrating analyzers, dispensing scents or pheromones or the stimulation of rubber trees by ethylene gas, etc.

Thus knowing the characteristics of standard aerosol valve 3, and of the geometry of the upper portion of aerosol container 2, those skilled in the art can define the characteristics for realizing the pneumatic component according to the invention, such as those of outflow orifice 6, and of spring 15 and/or of the initial pressure $P_1$ of the gas contained in upper chamber 10, as well as the initial position L1 of control member 20 in such a way that once the component is mounted on container 2, said control member 20 is positioned at a distance $L_2$ of end 29 of the component, in order to obtain a contact force of the spring and/or a pressure $P_2$ balancing the desired pressure $P_3$ in order to ensure the predefined rate of dispensing of the gas through orifice 6, of which rate can be obtained very low and also continuously without interruption, until container 2 is practically empty.

It can then be considered that the component according to embodiments of the invention realizes as such a device comprising a regulation device A that comprises:
- a high-pressure valve comprised of aerosol valve 3, maintained in closed position on its seating 4 by the internal gas pressure $P_4$ as well as by its retaining spring 5,
- a medium pressure chamber 11, referred to as a lower chamber,
- a control member comprised of leaktight shutter 20 closing one side of lower chamber 11 and controlling the opening/closing of valve 3,
- at least either a calibrating spring 15 or a counter pressure $P_2$, or both, and bearing against the other side of shutter 20.

According to the embodiment depicted in FIG. 3, shutter or control member 20 is an elastic means 14 comprised of a deformable membrane attached to its periphery to interior lateral walls 16 of hollow body 1 and which delimits, in the interior of the latter upper chamber 10, communicating with the ambient pressure Pa, said chamber comprises a calibrating or regulating spring 15 of which one end bears against the low face of a mechanism 17 for adjusting the spring and of which the other end bears against the upper face of membrane 14.

In the lower portion, membrane 14 delimits lower chamber 11 which is thus maintained at a constant pressure $P_3$ by an adjusting assembly comprised of membrane 14 exerting a pressure on aerosol valve 3 of gas container 2 by intermediary of the spring 15.

In another embodiment depicted in FIG. 4, control member or shutter 20 is a piston 20, replacing elastic membrane 14 of FIG. 3, sliding against the internal lateral walls 16 of the hollow body and provided with a seal 21 rubbing against the latter and providing a seal between lower chamber 11 and the upper chamber 10, the latter being of an interior cylindrical shape in order to allow for the sliding of piston 20.

Body 1 can thus be made of a single machine-tooled, molded or cast unit. In addition to outflow 6, body 1 can comprise a second gas outflow orifice 22, placing into communication lower chamber 11 with the exterior, and whereon a measuring pressure apparatus 23 can be mounted, such as a pressure meter. The rest of the description and the operating principle are similar to the previous description.

Figure 2:
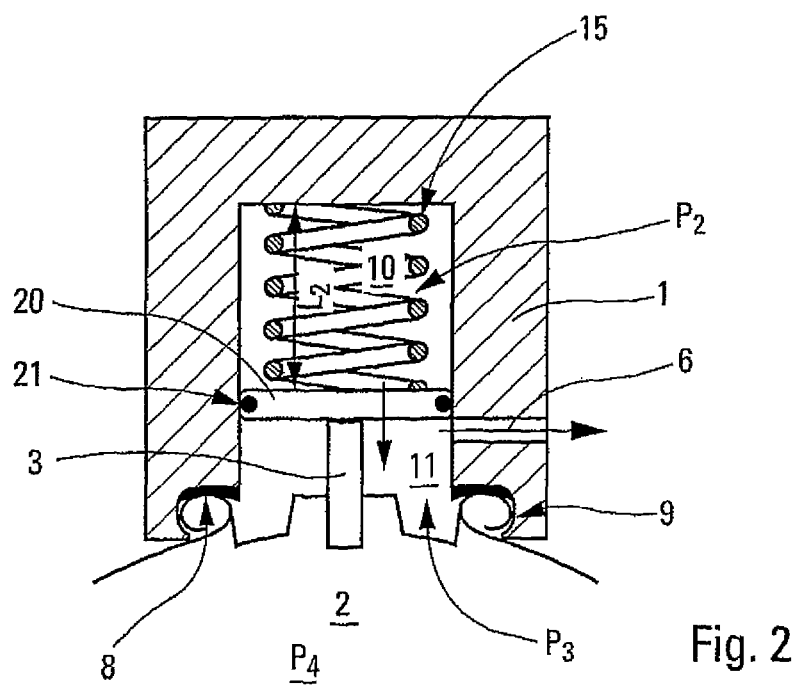
FIG. 2 depicts a lateral cross-section as in FIG. 1 of the same device mounted on the aerosol container according to an embodiment the invention.

According to the embodiment of FIGS. 1 and 2, control member 20 is identical to that of FIG. 4 but upper chamber 10 is fully closed and obstructed at its end 29 opposite piston 20 and to that distal 35 of hooking system 9 of the component, and constituting the upper end of the latter.

In this embodiment using the predetermined variation of pressure $P_1$, $P_2$ of a gas in upper chamber 10 then fully leaktight, lateral orifice 6 pierced in body 1 communicates with first upper chamber 10 when the device is ready to be installed on container 2, as depicted in FIG. 1, in order to be able, for example, pre-fill this upper chamber 10 with a gas at an initial pressure $P_1$.

Then, once the device attached on this container as depicted in FIG. 2, valve 3 causing piston 20 to rise again, compressing the gas contained in upper chamber 10, as explained previously, lateral orifice 6 then communicates with lower chamber 11.

A pneumatic component for the controlled micro-diffusion of gas is thus obtained, comprising in fact only two mobile parts one in relation to the other, i.e. body 1 and piston 20, two seals 8 and 21 and possibly a flow regulator valve 7.

FIG. 5 depicts a gas deflector 38 which can be mounted directly on the end of aerosol valve 3 of container 2 in order to deviate the flow of gas flowing out of valve 3 during the pressing on the latter by control member 14, 20.

Figure 6:
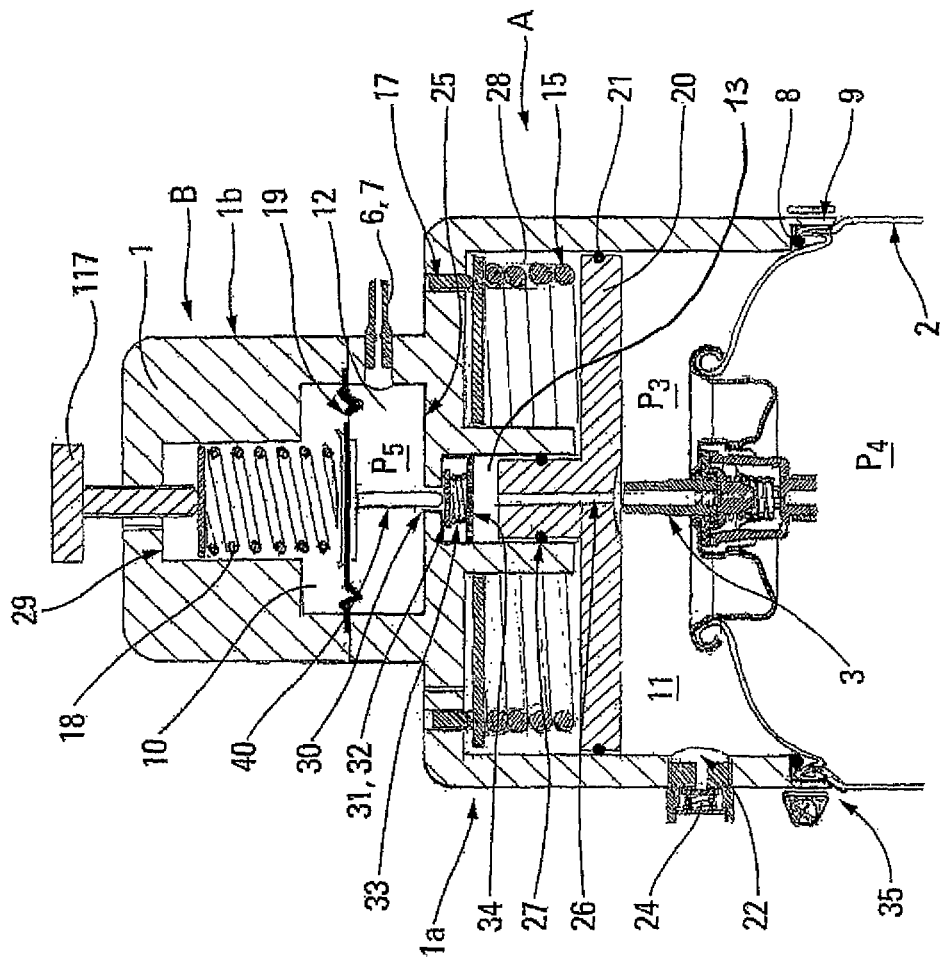
FIG. 6 depicts a cross-section of pneumatic component according to an embodiment of the invention.

Moreover, substantially in the embodiments of FIGS. 3, 4 and 6, control member 14, can be pierced in its center by at least one orifice 36, more preferably of small size. A seal 37 provides the tightness and the closing of the orifice 36 when the control member 14, 20 is maintained in contact with the deflector 38 by the force of the spring 15 and/or of the pressure $P_2$. When the calibrating spring 15 is relaxed thanks adjusting apparatus 17 and/or in the event of a purge of upper chamber 10, orifice 36 opens and connects lower chamber 11 and upper chamber 10, which makes it possible to obtain a quick decompression of the pressure $P_3$ prevailing inside lower chamber 11.

FIG. 6 depicts a pneumatic component for the diffusion of gas according to another embodiment of the invention wherein hollow body 1 comprises:
- a second lower chamber 12 arranged between first upper chamber 10 and first lower chamber 11 constituted once the component is attached to container 2, and closed between a second leaktight shutter 19 separating it from first upper chamber 10 and a transversal wall 25 pierced by an orifice 30 provided with a valve 32 opening by the pressing of a finger 40 linked to second shutter 19 and communicating with an intermediate chamber 13 closed itself opposite transversal wall 25 by first shutter 20,
- said first shutter 20 comprises an orifice 26 for the communication between first lower chamber 11 and intermediate chamber 13, lateral orifice 6 for the evacuation of the gases towards the exterior of the component being located in second lower chamber 12,
- a second upper chamber 28 closed by first shutter 20 and surrounding intermediate chamber 13 which is more preferably located in the center.

This alternative differs mainly from those described previously in that the regulator unit A described previously serves as a first stage of a dual stage regulator. In this case, the pressure $P_3$ delivered at the outflow of container 2 by the regulator unit A acts on the low face of a second regulator unit B that lowers the pressure of the gas delivered by orifice 6 to a regulated value that is lower and more precise. According to this embodiment, the pneumatic component according to the invention makes it possible to obtain a device such that it comprises:
- the incorporated adjusting apparatus A that belong entirely to lower section 1a of body 1 of the component and a pressure regulation apparatus B, arranged in series in a second section 1b cooperating with the first section by the intermediary of orifice 30,
- the two regulator units A and B separate body 1 into a first lower chamber 11 and an intermediate chamber 13 maintained at the pressure $P_3$ and a second lower chamber 12 maintained at a regulated pressure $P_5$, low pressure outflow 6 provided with a regulating flow apparatus 7 is arranged in second lower chamber 12 of second section 1b of body 1.

Body 1 thus comprises in its lower section 1a, a piston 20 provided with its seal 21 that delimits at the lower level lower chamber 11, maintained at the pressure $P_3$. A calibrating spring 15 located in second upper chamber 28 makes it possible to press against piston 20 with a pre-regulated force thanks to its adjusting device 17, said piston bears against the end of valve 3. The risks of overpressure at the level of lower chambers 11, 12 are prevented or inhibited thanks to a safety valve 24 mounted in the outflow orifice for medium pressure gas 22, placing into communication lower chambers 11, 12 with the exterior. This valve 24 is calibrated in such a way that it opens when the pressure in the chamber exceeds the setting.

Piston 20 slides at its periphery along the walls of cylindrical upper chamber 28 and in its center in a central bore which forms intermediate chamber 13, maintained at the same pressure $P_3$ as that of lower chamber 11 thanks to piston 20 provided with a central orifice 26 and a seal 27 cooperating with the walls of intermediate chamber 13. This chamber 13 communicates with second lower chamber 12 thanks to orifice 30 and is provided in the upper portion of valve 32 maintained in closed position on its seating 31 with a spring 33, itself maintained in tension by an adjusting apparatus such as a threaded ring 34.

The upper portion or section 1b of hollow body 1 comprises a second shutter with a deformable membrane 19 that delimits, in the interior of body 1 first upper chamber 10 enclosing a regulating spring 18 of which one end bears against the low face of a mechanism 117 for adjusting the spring and of which the other end bears against the upper face of membrane 19. Below membrane 19, is located second lower chamber 12 maintained at a constant pressure $P_5$ by adjusting pressure apparatus 19, 18.

The operating principle for each regulator unit is similar to that described previously.

It is understood from the previous descriptions that the unitary set according to the invention, which can be provided separately or with the gas container allows the user to have, via an intervention on the adjusting apparatus described previously, such as those of the pressure of the gas and/or of the spring in upper chamber 10, 28, of a requested constant, permanent and preselected rate.

Once the reserve of gas 2 has been depleted, the user can disconnect the pneumatic component according to embodiments the invention from its installation and replace the gas container when the latter is disposable or return it to the gas supplier who thanks to tooling that is proper therein can fill it again simply via the filling valve.

More preferably, this device is especially suitable to gas containers that can be transported.

Although the invention has been described with particular examples of embodiments, it is obvious that it is in no way limited thereof but on the contrary susceptible to modifications and alternatives that will appear to those skilled in the art and in that it comprises all of the technical elements of the means described as well as their combinations if the latter are included within the framework of the invention.

The invention claimed is:

1. A pneumatic component, adapted to be fastened to a gas container under pressure provided with an aerosol valve, the pneumatic component comprising:
   a hollow body presenting an interior portion comprising a first upper chamber enclosed by a leaktight and mobile shutter in relation to lateral interior walls of the interior portion of the hollow body and which surround said shutter forming a control member;
   a fastening system coupled to a periphery of a distal end of the hollow body beyond the shutter in relation to the upper chamber, the fastening system being adapted to cooperate with an upper portion of the gas container surrounding the aerosol valve;
   at least one lower chamber which is defined upon attachment of the component to the gas container, and enclosed between the shutter and said upper portion of the gas container, said shutter bearing against said aerosol valve according to a predetermined force when the pneumatic component is initially attached to the container, and said shutter continuously bearing against said aerosol valve according to a bearing force depending on the predetermined force and then on a balance with the pressure in the lower chamber; and
   structure defining a lateral orifice pierced in the body and in communication with the lower chamber, and adapted to promote evacuation of the gases contained within the gas container and through the lower chamber, towards an exterior of the pneumatic component once attached to the container,
   wherein the fastening system includes a seal and a hooking assembly adapted to cooperate in a leaktight manner with the upper portion of the gas container to define the at least one lower chamber,
   wherein the lateral outflow orifice is calibrated and adapted to predefine a certain flow of gas according to pressure of the lower chamber and maintained through a balance of pressure on either side of the control member, and
   wherein the lateral outflow orifice provides controlled micro-diffusion of the gas continuously and at a constant rate from the gas container and remaining unchanged until the gas container is substantially empty or the pneumatic component is removed from the gas container.

2. The pneumatic component according to claim 1, wherein the hollow body further comprises:
   a second lower chamber positioned between the first upper chamber and the first lower chamber defined upon attachment of the component to the container, and enclosed between a second leaktight shutter separating the second lower chamber from the first upper chamber and a transversal wall pierced by an orifice provided with a valve, the valve opening via the pressing of a finger coupled to the second shutter and in communication with an intermediate chamber, the intermediate chamber closed at a side opposite of the transversal wall by the first shutter;
   said first shutter comprising an orifice for the communication between the first lower chamber and the intermediate chamber, the lateral orifice for the evacuation of the gases towards the exterior of the component being located in the second lower chamber; and
   a second upper chamber enclosed by the first shutter.

3. The pneumatic component according to claim 1, wherein the control member comprising of an elastic element coupled at a periphery to the lateral walls.

4. The pneumatic component according to claim 1, wherein the control member comprises a piston slidable against the interior lateral walls, and the upper chamber is cylindrical.

5. The pneumatic component according to claim 4, wherein the upper chamber is fully closed and obstructed at an end opposite the piston.

6. The pneumatic component according to claim 5, wherein the lateral orifice pierced in the body being in communication with the first upper chamber when the device is to be installed on the container, and once the device is coupled to this container, the aerosol valve causing the piston to rise by compressing the gas contained in upper chamber, the lateral orifice being in communication with the lower chamber.

7. The pneumatic component according to claim 5, wherein the upper chamber is pre-filled with a gas at an initial pressure.

8. The pneumatic component according to claim 1, wherein the lateral orifice comprises a valve or comprises at least one nozzle element adapted to predefine a certain flow of gas.

9. The pneumatic component according to claim 1, further comprising a spring positioned in the upper chamber which bears against the control member.

10. The pneumatic component according to claim 9, further comprising an adjusting apparatus of said spring.

11. The pneumatic component of claim 1, wherein the body comprises structure defining a second orifice for gas outflow placing into communication the lower chamber with the exterior and whereon is mounted measuring pressure apparatus or a safety valve.

12. The pneumatic component according to claim 1, further comprising a gas deflector adapted to be mounted on an end of the aerosol valve of the container and to deviate the outflow of gas at the valve when the aerosol valve is pressed by the control member.

* * * * *